US012151357B2

(12) United States Patent
Lin et al.

(10) Patent No.: US 12,151,357 B2
(45) Date of Patent: Nov. 26, 2024

(54) WORKING DEVICE

(71) Applicant: Techtronic Cordless GP, Anderson, SC (US)

(72) Inventors: Ze Guang Lin, Dongguan (CN); Zhen Hua Li, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/108,294

(22) Filed: Feb. 10, 2023

(65) Prior Publication Data

US 2023/0264336 A1    Aug. 24, 2023

(30) Foreign Application Priority Data

Feb. 18, 2022    (CN) .......................... 202210152257.3

(51) Int. Cl.
*B25F 5/00*    (2006.01)
*A01G 3/08*    (2006.01)

(52) U.S. Cl.
CPC .............. *B25F 5/008* (2013.01); *A01G 3/085* (2013.01)

(58) Field of Classification Search
CPC ................................ B25F 5/008; A01G 3/085
See application file for complete search history.

(56) References Cited

U.S. PATENT DOCUMENTS

2013/0270933 A1*    10/2013    Kraetzig ................ A01D 34/90
310/227

* cited by examiner

*Primary Examiner* — Nathaniel C Chukwurah
(74) *Attorney, Agent, or Firm* — Dority & Manning, P.A.

(57) ABSTRACT

The present invention provides a working device, comprising a working portion and a grip portion. The working portion comprises a driving component and a working component driven by the driving component. The driving component comprises an electric motor and an electric motor housing. The electric motor housing comprises a housing body and a connecting portion located on a rear side of the housing body. At least one air intake hole is formed in the connecting portion, and is in communication with an inner cavity of the housing body. In the working device of the present invention, the driving component is provided with an air intake hole to allow air for cooling an electric motor to enter the interior of the driving component. Further, the working portion can be rotated with respect to the grip portion so as to have an increased working angle, and it can also be ensured that at least one air intake hole is always in communication with the outside when the working portion is in any angular position, so that the use efficiency of the electric motor can be ensured under any use condition.

15 Claims, 6 Drawing Sheets

WORKING DEVICE

This application claims the benefit of priority to Chinese Patent Application No. 202210152257.3, filed on Feb. 18, 2022, the disclosure of which is incorporated by reference herein in its entirety.

TECHNICAL FIELD

The present invention relates to the field of handheld working tools, and in particular to a working device such as a trimmer or a cutting machine.

BACKGROUND ART

At present, common working devices on the market, such as trimmers and cutting machines, have the problem of overheating of a motor during working. To cool the motor, an air intake hole and an exhaust hole that are in communication with the outside may be formed in a motor housing. The positions of the air intake hole and the exhaust hole are generally arranged simply. In some working devices, a working component may be rotatable relative to a handle, so that the part of the working component that engages with the handle may be covered by the handle. In this case, simply selecting the position of the air intake hole in the working component may result in the air intake hole being covered by the handle when the working component is rotated to a certain angle relative to the handle, thereby affecting the cooling effect on the motor and affecting the performance of the working device.

In addition, in the common working devices on the market, the housing for accommodating the motor is usually an integral cavity; as a result, a hot airflow that has passed through the motor may flow in the housing. For example, the hot airflow may be mixed with a cold airflow that will flow to the motor, or may flow to an output end of the motor, resulting in a reduced cooling effect on the motor.

Therefore, there is a need to provide a working device to at least partially solve the above problem.

SUMMARY OF THE INVENTION

An objective of the present invention is to provide a working device such as a trimming device or a cutting device. In the working device of the present invention, a driving component is provided with an air intake hole to allow air for cooling an electric motor to enter the interior of the driving component. Further, a working portion can be rotated with respect to a grip portion so as to have an increased working angle, while the air intake hole in the driving component for introducing an airflow to cool the electric motor is arranged such that at least one air intake hole is always in communication with the outside when the working portion is in any angular position, so that the use efficiency of the electric motor can be ensured under any use condition.

Further, in the working device of the present invention, a partition plate is provided in an electric motor housing, ensuring that the hot airflow that has passed through the electric motor can only be discharged from an exhaust hole without entering other areas in the electric motor housing, in particular without mixing with a cold airflow that will flow to the electric motor. Such an arrangement further ensures the cooling efficiency for the electric motor, and also ensures that the performance of an output end of the electric motor and a working component connected to the output end is not affected by the hot airflow.

According to one aspect of the present invention, a working device is provided, comprising a working portion and a grip portion, the working portion comprising a driving component and a working component driven by the driving component, the driving component comprising an electric motor and an electric motor housing, wherein the electric motor housing comprises:

a housing body, the electric motor being located in the housing body, and an exhaust hole being formed in the housing body; and a connecting portion located on a rear side of the housing body, wherein at least one air intake hole is formed in the connecting portion, and is in communication with an inner cavity of the housing body.

In an embodiment, the electric motor housing has a variable angle relative to the grip portion, and the connecting portion comprises at least two air intake holes positioned such that at least one of the at least two air intake holes is exposed to the outside when the electric motor housing is at any angular position relative to the grip portion.

In an embodiment, an extending direction of the at least one air intake hole is substantially perpendicular to an extending direction of the working component.

In an embodiment, the air intake hole is configured to provide a bent air intake path, which preferably has a bending angle of approximately 90°.

In an embodiment, the connecting portion comprises a baffle plate arranged on an inner side of the air intake hole and aligned with and spaced from the air intake hole, the baffle plate being designed to block an airflow so as to divert the airflow, and preferably having a size substantially the same as that of the air intake hole.

In an embodiment, the working portion is configured to have an angle about an axis relative to the grip portion that can vary by 90°, and preferably by 180°; optionally, the connecting portion is provided with two or more air intake holes spaced apart in a circumferential direction of the axis, and preferably, two or three air intake holes respectively spaced apart by 90°; and optionally, the at least one air intake hole is positioned on the side of the connecting portion facing away from the working component.

In an embodiment, the working device further comprises a long rod portion located between the electric motor housing and the grip portion, wherein the connecting portion is rotatably connected to the long rod portion.

In an embodiment, the long rod portion comprises a long rod portion body and a pair of clamping portions protruding from the long rod portion body and facing each other, the connecting portion is pivotally clamped between the pair of clamping portions, and each of the air intake holes is an elongated hole extending between the pair of clamping portions.

In an embodiment, the connecting portion always has a surface in close contact with the grip portion body during rotation of the electric motor housing relative to the grip portion, wherein at least one of the air intake holes is in close contact with the grip portion body and is accordingly covered when the electric motor housing is rotated to an extreme angular position relative to the grip portion.

In an embodiment, a partition plate is provided inside the housing body and hermetically divides the housing body into a first space and a second space, the partition plate is positioned such that an exhaust position of the electric motor is located inside the first space, an output end of the electric motor is located inside the second space, the output end of the electric motor is preferably arranged close to an air intake end thereof, and the partition plate is preferably a component separate from the housing.

In an embodiment, the exhaust hole is formed in a side face of the housing body that is offset from the working component.

In an embodiment, the working component is a trimming component or a cutting component, and preferably the working component has a dimension in a radial direction with respect to the rotation direction that is greater than a corresponding dimension of the electric motor housing.

In an embodiment, the working device defines an airflow path from the at least one air intake hole to the exhaust hole of the electric motor housing, at least a part of the working component is located in the airflow path, and preferably a gear transmission portion of the working component is located in the airflow path.

In an embodiment, the working portion and the connecting portion are located on two opposite sides of the housing body.

BRIEF DESCRIPTION OF THE DRAWINGS

For a better understanding of the above and other objectives, features, advantages and functions of the present invention, reference may be made to the preferred embodiments shown in the accompanying drawings. In the accompanying drawings, the same reference numerals refer to the same components. It should be understood by those skilled in the art that the accompanying drawings are intended to illustrate schematically preferred embodiments of the present invention and do not impose any limitation to the scope of the present invention, and that the individual components in the figures are not drawn to scale.

LIST OF REFERENCE SIGNS

Figure 1A:
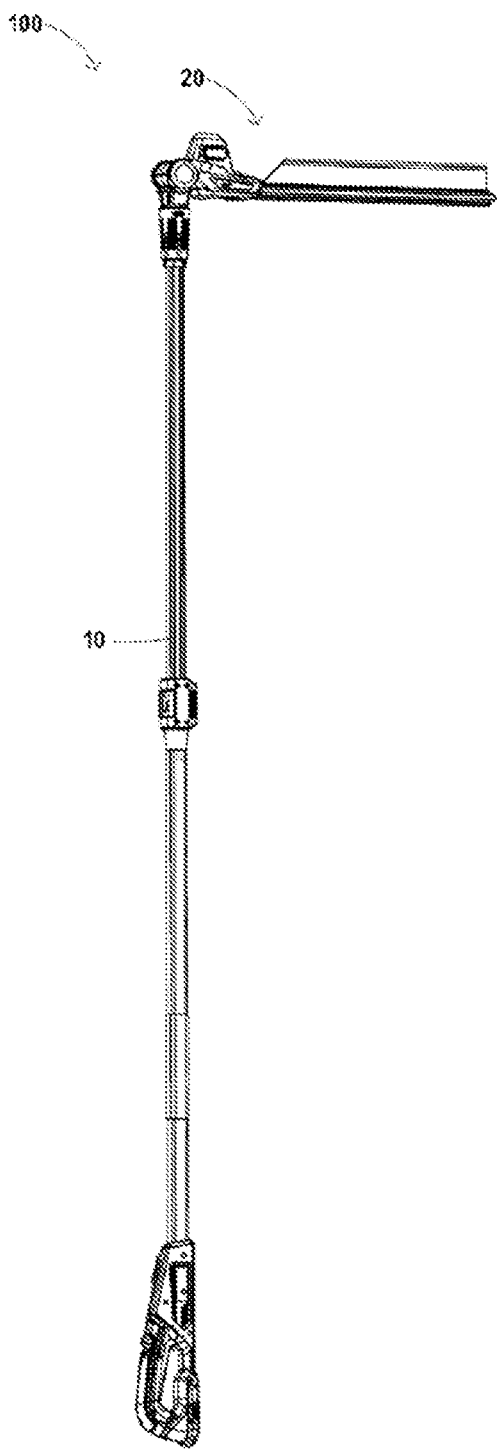
FIG. 1A is a perspective view of a working device according to some preferred embodiments of the present invention.

100 Working device
10 Long rod portion
11 Long rod portion body
12 Clamping portion
20 Working portion
21 Driving component
22 Working component
211 Housing body
211a Exhaust hole
212 Connecting portion
212a, 212b Air intake hole
213 Air intake path
214 Baffle plate
215 Connecting plate
216 Electric motor
216a Exhaust position of the electric motor
216b Output end of the electric motor
217 Partition plate
30 Grip portion
R Rotation direction

DETAILED DESCRIPTION OF EMBODIMENTS

Specific embodiments of the present invention are now described in detail with reference to the accompanying drawings. Only preferred embodiments according to the present invention are described here, and those skilled in the art would conceive of other ways of implementation of the present invention on the basis of the preferred embodiments, which also fall within the scope of the present invention.

FIGS. 1A-5 show some preferred embodiments of a working device according to the present invention. First, it should be noted that directional and positional terms in the present invention should be construed as relative directions and positions, not absolute directions and positions. The directional and positional terms in the present invention can be explained with reference to exemplary structures shown in FIGS. 1A-5. For example, the rotation directions of a working portion, a driving component and a connecting portion of an electric motor housing relative to a long rod portion according to the present invention can be understood with reference to direction R in FIGS. 2-4; and a rotation angle may be understood as an angle by which a housing body (or a working component) is rotated relative to the long rod portion (i.e., relative to a grip portion).

Figure 1B:
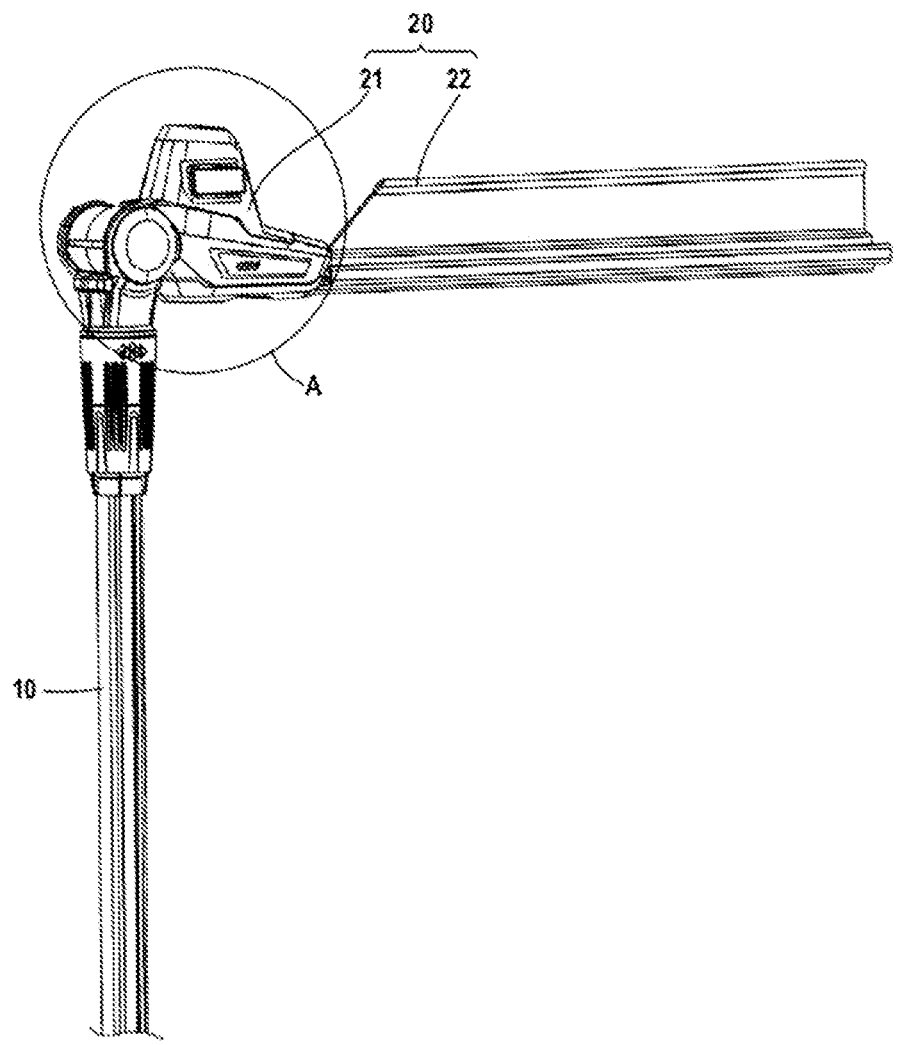
FIG. 1B is a perspective view in which a grip portion and part of a long rod structure in FIG. 1A are cut off.

FIGS. 1A and 1B show a working device 100 in some embodiments. The working device 100 comprises a working portion 20, a long rod portion 10, and a grip portion 30. The long rod portion 10 is connected between the grip portion 30 and the working portion 20. The working portion 20 comprises a driving component 21 connected to the long rod portion 10, and a working component 22 protruding from the side of the driving component 21 facing away from the long rod portion 10 and driven by the driving component 21. The working portion 20 can be rotated relative to the long rod portion 10, so that a working range of the working portion 20 can be increased.

In some embodiments, the working device 100 is, for example, a trimmer or a cutting machine, the working component 22 is a trimming component or a cutting component, the long rod portion 10 is configured to enable, for example, the working device 100 to be used for trimming high branches, and the actual length of the long rod structure may be selectively set according to the height of an area to be worked. In some embodiments, the long rod portion 10 is removable. For example, a user may selectively remove the long rod portion 10 to directly engage the grip portion 30 with the working portion 20 when a target working area is not located at a high place. Preferably, the dimension of the working component 22 has a dimension in a radial direction with respect to the rotation direction R that is greater than a corresponding dimension of the electric motor housing. That is to say, in some embodiments, the rotation angle of the working portion 20 relative to the long rod portion 10 is increased, and the length of the working component 22 is also increased, so that under the combined effect, the working area of the working portion 20 can be further increased.

It may be understood that since the relative positions of the long rod portion 10 and the grip portion 30 are fixed during working, the process of rotating the working portion 20 relative to the long rod portion 10 may also be understood as the process of rotating the working portion 20 relative to the grip portion, and a rotation angle of the working portion 20 relative to the long rod portion 10 may also be understood as a rotation angle of the working portion 20 relative to the grip portion 30.

Figure 2:
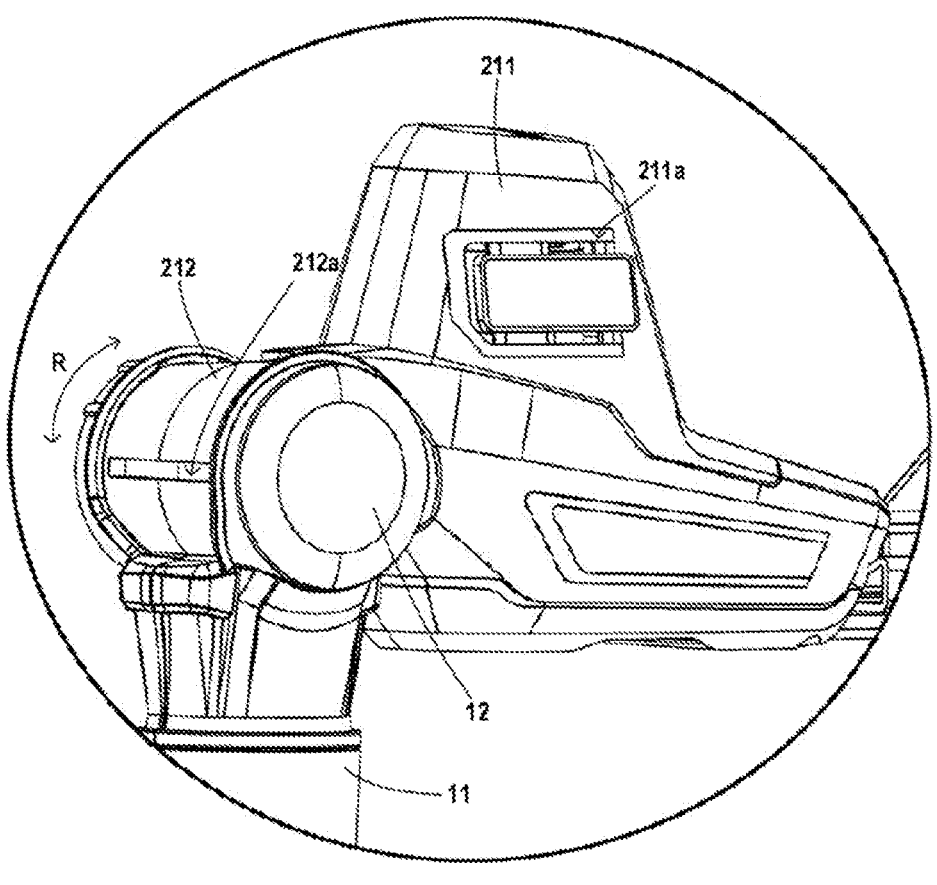
FIG. 2 is a partial enlarged view of part A of FIG. 1B.

Referring to FIG. 2, the driving component 21 comprises an electric motor housing, the electric motor housing in turn comprises a housing body 211 and a connecting portion 212 that have inner cavities in communication with each other, and the electric motor housing has a variable angle relative to the grip portion 30. The connecting portion 212 is located on a rear side of the housing body 211. The term "rear side" may be understood as the side facing away from the working area. In some embodiments, the electric motor 216 is located inside the housing body 211, and the connecting portion 212 is configured to be rotatably connected to the long rod portion 10, for example, to rotatably engage with the long rod portion 10 around the connecting portion 212.

In some embodiments, the long rod portion 10 comprises a long rod portion body 11 and a pair of clamping portions 12 protruding from the long rod portion body 11 and facing each other, and the connecting portion 212 is pivotally clamped between the pair of clamping portions 12. It may be understood that during rotation of the connecting portion 212 relative to the long rod portion 10, the position of the connecting portion 212 relative to the long rod portion 10 is roughly unchanged, while the housing body 211 on one side of the connecting portion 212 is driven to change an angle formed between the housing body and the long rod portion 10. The position of the working component 22 is also roughly fixed relative to the housing body 211, so that the working component can be rotated together with the housing body 211 relative to the long rod portion 10 to change the angle formed between the working component and the long rod portion 10. It should be noted that, the fact that the position of the working component 22 is roughly fixed relative to the housing body 211 does not mean that the working component 22 must be completely fixedly connected to the housing body 211. For example, the working component 22 may extend or retract relative to the housing body 211.

In some embodiments, the driving component 21 is provided with an air passage for providing air circulation to cool the electric motor 216, and the electric motor housing is provided with at least one air intake hole 212a, 212b and at least one exhaust hole 211a. In order to prevent branches and leaves cut off by the working component 22, dust thereon, etc. from entering the air intake hole 212a, 212b, the air intake hole 212a, 212b should be as far away from the working component 22 as possible, and thus, the air intake hole 212a, 212b is preferably formed in the connecting portion 212, in particular in a side face of the connecting portion 212 that faces away from the working component 22. The exhaust hole 211a should be provided as close as possible to an air discharge position of the electric motor 216, so that the exhaust hole 211a is formed in the housing body 211. In order to prevent the branches and leaves cut off by the working component 22, the dust thereon, etc. from entering the air intake hole 212a, 212b, the exhaust hole 211a is formed in a side face of the housing body 211 that is offset from the working component 22, that is, the exhaust hole 211a does not directly face the working component 22.

Although the arrangement of the air intake hole 212a, 212b in the connecting portion 212 is a preferred arrangement, some problems are also caused. For example, if the connecting portion 212 always has a surface in close contact with the long rod portion body 11 during rotation of the electric motor housing relative to the long rod portion 10, a situation may arise in which the air intake hole is in close contact with the long rod portion body 11 and is accordingly covered. In order to solve this problem, at least two air intake holes are provided, which are arranged spaced apart from each other on the connecting portion 212 in the rotation direction R, and the at least two air intake holes are positioned such that at least one of the at least two air intake holes is exposed to the outside when the electric motor housing is located at any angular position relative to the long rod portion 10.

Figure 3:
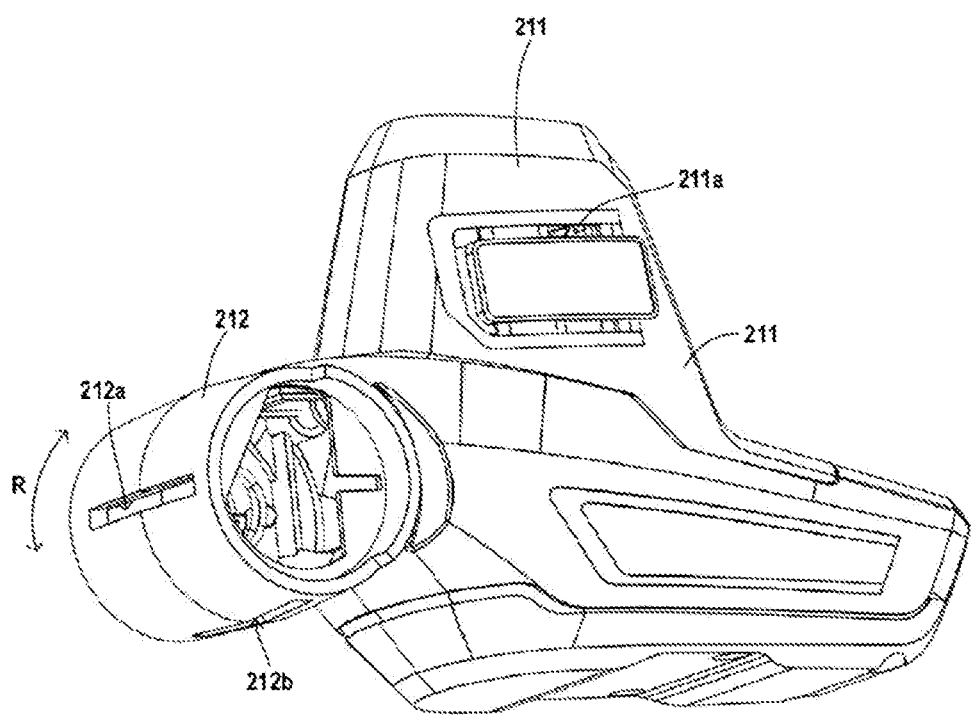
FIG. 3 is a separate schematic view of an electric motor in FIG. 2, showing two air intake holes in a connecting portion of an electric motor housing.

FIG. 3 shows two air intake holes 212a, 212b in parts of the connecting portion 212, and the two air intake holes 212a, 212b are arranged spaced apart by approximately 90° in the rotation direction R. In a structure, for example, shown in FIG. 2, the air intake hole 212b is in close contact with the long rod portion body 11 and is accordingly covered, and the air intake hole 212a is exposed to the outside and accordingly can still introduce a cold airflow to the electric motor 216, ensuring normal cooling of the electric motor 216. As the working portion 20 continues to be rotated relative to the long rod portion 10 so as to increase the angle therebetween, the air intake hole 212a may be covered by the long rod portion body 11. If the air intake hole 212a is covered, the air intake hole 212b must be exposed to the outside. Preferably, when the electric motor housing is rotated to an extreme angular position relative to the long rod portion 10, the at least one air intake hole is in close contact with the long rod portion body 11 and is accordingly covered, and with such an arrangement, excessively concentrated arrangement of the air intake holes can be avoided.

In some embodiments, the working portion 20 is configured to have an angle about an axis (e.g., the rotation axis) relative to the long rod portion 10 that can vary by 90°, and preferably by 180°. The number and spacing angle of air intake holes 212a may be determined according to the rotation angle of the working portion 20 relative to the long rod portion 10. For example, in an embodiment in which the working portion can be rotated by 180° relative to the long rod portion, three or more air intake holes may be provided, which may be sequentially arranged spaced apart by 90° in the rotation direction.

In order to increase the areas of the air intake holes 212a, 212b while preventing introduction of foreign matter from the air intake hole 212a, the air intake holes 212a, 212b may be configured as long holes. For example, the air intake hole 212a may be a long hole extending between the two clamping portions 12, and the extending directions of the air intake holes 212a, 212b are substantially perpendicular to the extending directions of the working component 22. To further avoid the introduction of foreign matter from the air intake hole 212a, the air intake hole 212a may also have a special arrangement as shown in FIG. 4.

Figure 4:
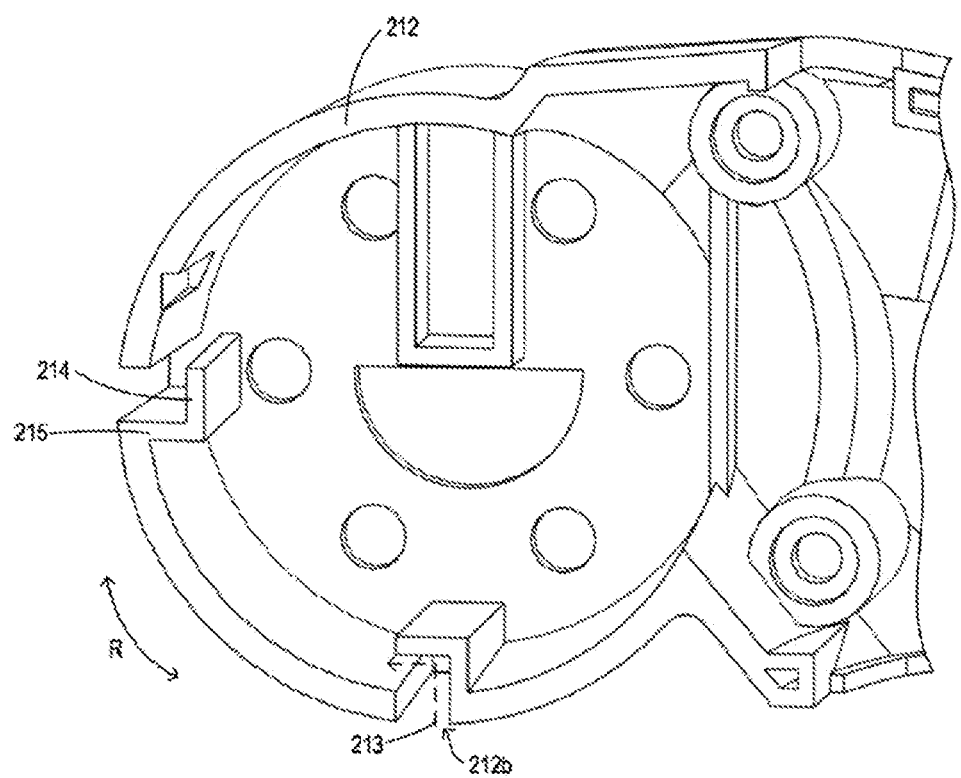
FIG. 4 is a partial schematic structural view of the connecting portion in FIG. 3 with a right-side housing component at the connecting portion removed and a left-side housing component left, in order to clearly show the structural arrangement at the air intake hole.
Figure 5:
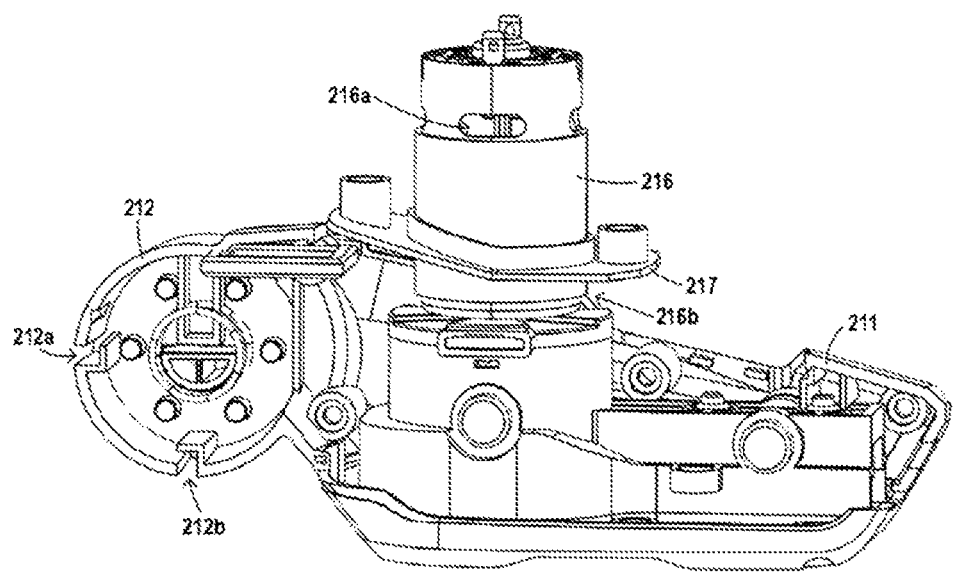
FIG. 5 is a schematic view showing an internal structure of the electric motor in FIG. 3.

Referring to FIG. 4, in some embodiments, the air intake hole 212a is configured to provide a bent air path 213. For example, the air path 213 has a bent structure in a plane (e.g., the plane shown in FIG. 4) perpendicular to the rotation axis of the connecting portion 212. It is preferable that the air intake path 213 has a bending angle of approximately 90°. The "rotation axis" is a virtual straight line that passes, for example, through the centre of a circle formed by an outer contour of the connecting portion 212 shown in FIG. 4. Referring to FIG. 3, a housing component at the connecting portion 212 may comprise, for example, a left-side housing component and a right-side housing component abutting together in the extending direction of the rotation axis, but the schematic view shown in FIG. 4 is the structure with the right-side housing component at the connecting portion 212 removed and the left-side housing component left.

In some embodiments, the air intake path 213 having a bending angle may be provided by providing a baffle plate. For example, the connecting portion 212 comprises a baffle plate 214 arranged on an inner side of the air intake hole 212a and aligned with and spaced from the air intake hole 212a. The baffle plate 214 is designed to block an airflow so as to divert the airflow. A connecting plate 215 is connected between the portion of the electric motor housing defining the air intake hole 212a and the baffle plate 214. Preferably, the baffle plate 214 has a size substantially the same as that of the air intake hole 212a.

The present invention further has other preferred arrangements in terms of the configuration of the air passage for cooling the electric motor 216. For example, referring to FIG. 5, the air discharge position of the electric motor 216 is arranged close to the top end thereof, an air intake position of the electric motor 216 may be arranged, for example, close to the bottom end thereof, and an output end 216b of the electric motor 216 may be arranged close to the air intake position thereof. The output end 216b of the electric motor 216 may be connected to a working body of the working component 22 via a transmission mechanism (e.g., a gear transmission mechanism), for example. Preferably, a partition plate 217 is provided inside the housing body 211. The partition plate 217 hermetically divides the housing body 211 into a first space (e.g., a space above the partition plate 217) and a second space (e.g., a space below the partition plate 217). An exhaust position 216a of the electric motor 216 is positioned in the first space; and the output end 216b and the air intake position of the electric motor 216 are positioned in the second space. Such an arrangement can enable the hot airflow that has passed through the electric motor 216 to be discharged only through the exhaust hole 211a without entering other areas in the electric motor housing, in particular without mixing with the cold airflow that will flow to the electric motor 216. Such an arrangement ensures the cooling efficiency for the electric motor 216, and also ensures that the performance of the output end 216b of the electric motor 216 and the working component 22 connected to the output end 216b is not affected by the hot airflow.

The working device defines an airflow path from the at least one air intake hole 212a, 212b to the exhaust hole 211a of the electric motor housing, at least a part of the working component 22 is located in the airflow path, and preferably a gear transmission portion of the working component 22 is located in the airflow path.

Preferably, the partition plate 217 is a component separate from the electric motor housing, rather than a rib on the electric motor housing itself. Such an arrangement allows the partition plate 217 to be removed separately, enabling the housing body 211 to re-define an integral space when there is a special need.

In the working device of the present invention, a driving component is provided with the air intake hole to allow air for cooling the electric motor to enter the interior of the driving component. Further, the working portion can be rotated with respect to the grip portion so as to have an increased working angle, while the air intake hole in the driving component for introducing an airflow to cool the electric motor is arranged such that at least one air intake hole is always in communication with the outside when the working portion is in any angular position, so that the use efficiency of the electric motor can be ensured under any use condition. The present invention further ensures that the hot airflow that has passed through the electric motor can only be discharged from an exhaust hole without entering other areas in the electric motor housing, in particular without mixing with a cold airflow that will flow to the electric motor. Such an arrangement further ensures the cooling efficiency for the electric motor, and also ensures that the performance of an output end of the electric motor and a working component connected to the output end is not affected by the hot airflow.

The foregoing description of the multiple embodiments of the present invention is provided for descriptive purposes to a person of ordinary skill in the related art. It is not intended to exclude or limit the present invention to a single disclosed embodiment. As described above, various alternatives and modifications of the present invention will be apparent to those of ordinary skill in the art in light of the above teachings. Therefore, although some alternative embodiments have been described specifically, other embodiments will be apparent or relatively readily developed by those of ordinary skill in the art. The present invention aims to include all alternatives, modifications and variations of the present invention described herein, and the other embodiments that fall within the spirit and scope of the present invention described above.

The invention claimed is:

1. Working device, comprising a working portion and a grip portion, the working portion comprising a driving component and a working component driven by the driving component, the driving component comprising an electric motor and an electric motor housing, wherein the electric motor housing has a variable angle relative to the grip portion, wherein the electric motor housing comprises:
   a housing body, the electric motor being located in the housing body, and an exhaust hole being formed in the housing body; and
   a connecting portion located on a rear side of the housing body, wherein at least two air intake holes are formed in the connecting portion, and is in communication with an inner cavity of the housing body, wherein the at least two air intake holes are positioned such that at least one of the at least two air intake holes is exposed to outside when the electric motor housing is at any angular position relative to the grip portion.

2. Working device according to claim 1, wherein an extending direction of at least one air intake hole of the at least two air intake holes is substantially perpendicular to an extending direction of the working component.

3. Working device according to claim 1, wherein at least one air intake hole of the at least two air intake holes is configured to provide a bent air intake path.

4. Working device according to claim 1, wherein the connecting portion comprises a baffle plate arranged on an inner side of an air intake hole of the at least two air intake holes and aligned with and spaced from the air intake hole, the baffle plate being designed to block an airflow so as to divert the airflow.

5. Working device according to claim 1, wherein the working portion is configured to have an angle about an axis relative to the grip portion that can vary by 90°.

6. Working device according to claim 1, wherein the working device further comprises a long rod portion located between the electric motor housing and the grip portion, wherein the connecting portion is rotatably connected to the long rod portion.

7. Working device according to claim 6, wherein the long rod portion comprises a long rod portion body and a pair of clamping portions protruding from the long rod portion body and facing each other, the connecting portion is pivotally clamped between the pair of clamping portions, and each of the air intake holes of the at least two air intake holes is an elongated hole extending between the pair of clamping portions.

8. Working device according to claim 1, wherein the connecting portion always has a surface in close contact with the grip portion body during rotation of the electric motor housing relative to the grip portion, wherein at least one of air intake hole of the at least two air intake holes is in close contact with the grip portion body and is accordingly covered when the electric motor housing is rotated to an extreme angular position relative to the grip portion.

9. Working device according to claim 1, wherein a partition plate is provided inside the housing body and hermetically divides the housing body into a first space and a second space, the partition plate is positioned such that an exhaust position of the electric motor is located inside the first space, an output end of the electric motor is located inside the second space.

10. Working device according to claim 1, wherein the exhaust hole is formed in a side face of the housing body that is offset from the working component.

11. Working device according to claim 1, wherein the working component is a trimming component or a cutting component.

12. Working device according to claim 1, wherein the working device defines an airflow path from the at least two air intake holes to the exhaust hole of the electric motor housing, at least a part of the working component is located in the airflow path.

13. Working device according to claim 1, wherein the working portion and the connecting portion are located on two opposite sides of the housing body.

14. Working device, comprising a working portion and a grip portion, the working portion comprising a driving component and a working component driven by the driving component, the driving component comprising an electric motor and an electric motor housing, wherein the electric motor housing comprises:
    a housing body, the electric motor being located in the housing body, and an exhaust hole being formed in the housing body; and
    a connecting portion located on a rear side of the housing body, wherein at least one air intake hole is formed in the connecting portion, and is in communication with an inner cavity of the housing body, wherein the connecting portion comprises a baffle plate arranged on an inner side of the air intake hole and aligned with and spaced from the air intake hole, the baffle plate being designed to block an airflow so as to divert the airflow.

15. Working device, comprising a working portion and a grip portion, the working portion comprising a driving component and a working component driven by the driving component, the driving component comprising an electric motor and an electric motor housing, wherein the electric motor housing comprises:
    a housing body, the electric motor being located in the housing body, and an exhaust hole being formed in the housing body; and
    a connecting portion located on a rear side of the housing body, wherein at least one air intake hole is formed in the connecting portion, and is in communication with an inner cavity of the housing body, wherein a partition plate is provided inside the housing body and hermetically divides the housing body into a first space and a second space, the partition plate is positioned such that an exhaust position of the electric motor is located inside the first space, an output end of the electric motor is located inside the second space.

* * * * *